United States Patent
Jackson

(10) Patent No.: US 9,752,303 B2
(45) Date of Patent: Sep. 5, 2017

(54) METHOD AND APPARATUS FOR IMPLEMENTING OPERATIONAL PRACTICES FOR CONSTRUCTION MACHINES

(71) Applicant: Topcon Positioning Systems, Inc., Livermore, CA (US)

(72) Inventor: Richard Jackson, Redland Bay (AU)

(73) Assignee: Topcon Positioning Systems, Inc., Livermore, CA (US)

(*) Notice: Subject to any disclaimer, the term of this patent is extended or adjusted under 35 U.S.C. 154(b) by 0 days.

(21) Appl. No.: 14/747,602

(22) Filed: Jun. 23, 2015

(65) Prior Publication Data

US 2015/0376868 A1    Dec. 31, 2015

Related U.S. Application Data

(60) Provisional application No. 62/018,311, filed on Jun. 27, 2014.

(51) Int. Cl.
| | |
|---|---|
| *E02F 9/00* | (2006.01) |
| *E02F 9/20* | (2006.01) |
| *G05B 23/02* | (2006.01) |
| *G06Q 50/08* | (2012.01) |
| *E02F 3/43* | (2006.01) |
| *E02F 9/26* | (2006.01) |

(Continued)

(52) U.S. Cl.
CPC .............. *E02F 9/2025* (2013.01); *E02F 3/43* (2013.01); *E02F 5/145* (2013.01); *E02F 9/2029* (2013.01); *E02F 9/26* (2013.01); *E02F 9/265* (2013.01); *E02F 9/268* (2013.01); *G05B 23/0294* (2013.01); *G06Q 10/20* (2013.01); *G06Q 50/08* (2013.01)

(58) Field of Classification Search
CPC ....... E02F 9/2025; E02F 9/2029; E02F 9/268; E02F 9/265; E02F 3/43; G05B 23/0294; G06Q 50/08
USPC ................................ 701/50, 1, 123; 340/439
See application file for complete search history.

(56) References Cited

U.S. PATENT DOCUMENTS

| | | | |
|---|---|---|---|
| 6,434,512 B1 * | 8/2002 | Discenzo | ................ F16C 19/52 702/184 |
| 7,206,689 B1 * | 4/2007 | Johnson | ................ B60W 10/06 701/103 |

(Continued)

FOREIGN PATENT DOCUMENTS

EP          1596013 A2     11/2005

OTHER PUBLICATIONS

International Search Report and Written Opinion mailed on Aug. 26, 2015, in connection with International Patent No. PCT/US2015/037348, 9 pgs.

*Primary Examiner* — Marthe Marc-Coleman
(74) *Attorney, Agent, or Firm* — Chiesa Shahinian & Giantomasi PC

(57) ABSTRACT

A system and method for providing guidance to a user of a construction machine include computing kinematic behavior of a construction machine based on data received from the construction machine while performing a task. The kinematic behavior is compared with a model for operating the construction machine for performing the task. Feedback data is sent to the construction machine based on the comparing to provide guidance to the user of the construction machine for performing the task.

20 Claims, 6 Drawing Sheets

(51) Int. Cl.
*G06Q 10/00* (2012.01)
*E02F 5/14* (2006.01)

(56) References Cited

U.S. PATENT DOCUMENTS

| | | | | |
|---|---|---|---|---|
| 8,855,792 B2* | 10/2014 | Landgraf | ............... | G05B 17/02 |
| | | | | 700/108 |
| 2003/0054808 A1* | 3/2003 | Watanabe | ................. | E02F 9/20 |
| | | | | 455/414.1 |
| 2008/0140435 A1* | 6/2008 | Arakawa | .................. | E02F 9/26 |
| | | | | 705/1.1 |
| 2008/0208415 A1* | 8/2008 | Vik | ........................ | E21C 41/26 |
| | | | | 701/50 |
| 2009/0099707 A1 | 4/2009 | Greiner et al. | | |
| 2010/0057290 A1* | 3/2010 | Brillhart | ................ | G06Q 10/06 |
| | | | | 701/31.4 |
| 2012/0215379 A1* | 8/2012 | Sprock | .................. | E02F 9/2054 |
| | | | | 701/2 |
| 2012/0296514 A1* | 11/2012 | Sohmshetty | ...... | G06F 17/30539 |
| | | | | 701/30.2 |
| 2012/0308354 A1* | 12/2012 | Tafazoli Bilandi | ..... | B66C 13/46 |
| | | | | 414/685 |
| 2014/0156105 A1 | 6/2014 | Faivre et al. | | |
| 2014/0188328 A1* | 7/2014 | Schneider | ............. | G07C 5/008 |
| | | | | 701/29.6 |

* cited by examiner

METHOD AND APPARATUS FOR IMPLEMENTING OPERATIONAL PRACTICES FOR CONSTRUCTION MACHINES

This application claims the benefit of U.S. Provisional Application No. 62/018,311, filed Jun. 27, 2014, the disclosure of which is herein incorporated by reference in its entirety.

BACKGROUND OF THE INVENTION

The present invention relates generally to construction machine management and more particularly to implementing operational practices for construction machines.

Construction sites are typically managed by assigning tasks of a construction project to operators of construction machines to safely and efficiently complete the construction project within the scheduled time. Construction sites usually include a number of different construction machines working together to complete tasks of the construction project. The completion of a task in a safe and efficient manner depends on the level of skill and experience of the operator. For example, an inexperienced operator may perform tasks in a non-optimal manner, which results in inefficiency, increased wear and tear on the machine, unsafe workplace conditions, and increased operator fatigue. Conformance of the operators to the best operational practices of the machine is especially important in a construction site environment, where multiple construction machines cooperate with or depend upon each other to complete a task.

BRIEF SUMMARY OF THE INVENTION

A system and method for providing guidance to a user of a construction machine include computing kinematic behavior of a construction machine based on data received from the construction machine while performing a task. The kinematic behavior is compared with a model for operating the construction machine for performing the task. Feedback data is sent to the construction machine based on the comparing to provide guidance to the user of the construction machine for performing the task.

These and other advantages of the invention will be apparent to those of ordinary skill in the art by reference to the following detailed description and the accompanying drawings.

DETAILED DESCRIPTION

Figure 1:
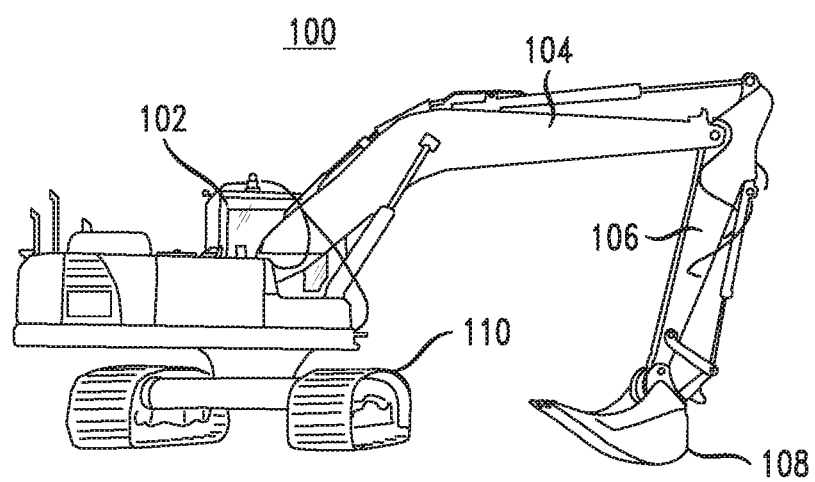
FIG. 1 depicts an exemplary excavator, in accordance with one or more embodiments.

FIG. 1 shows an exemplary construction equipment or machine in accordance with one or more embodiments. The machine in FIG. 1 is shown as an excavator 100. Excavator 100 includes cab 102, boom 104, stick 106, and bucket 108. Cab 102, boom 104, stick 106, and bucket 108 are rotatably mounted on an undercarriage 110 of excavator 100, which may include tracks or wheels. An operator controls excavator 100 from cab 102 to move it to a desired location and manipulate various materials, such as dirt. Excavator 100 may be equipped with sensors (not shown) to provide measurements of excavator 100.

A construction project may involve multiple machines (e.g., excavator 100). Any incorrect or unscheduled action of the machines by the operator, for example, due to stress or limited capability, directly impacts the health of the machine, the safety of the operator and other workers, the productivity of the operator, and the cost of the operations. Examples of incorrect actions on excavator 100 include stressing boom 104, roughly swinging stick 106, and under filling bucket 108 of excavator 100. Advantageously, improved performance and operation of excavator 100 may be achieved by comparing measurements of excavator 100 (e.g., using sensors) with models defining operational practices to provide feedback to the operator (or others).

Figure 2:
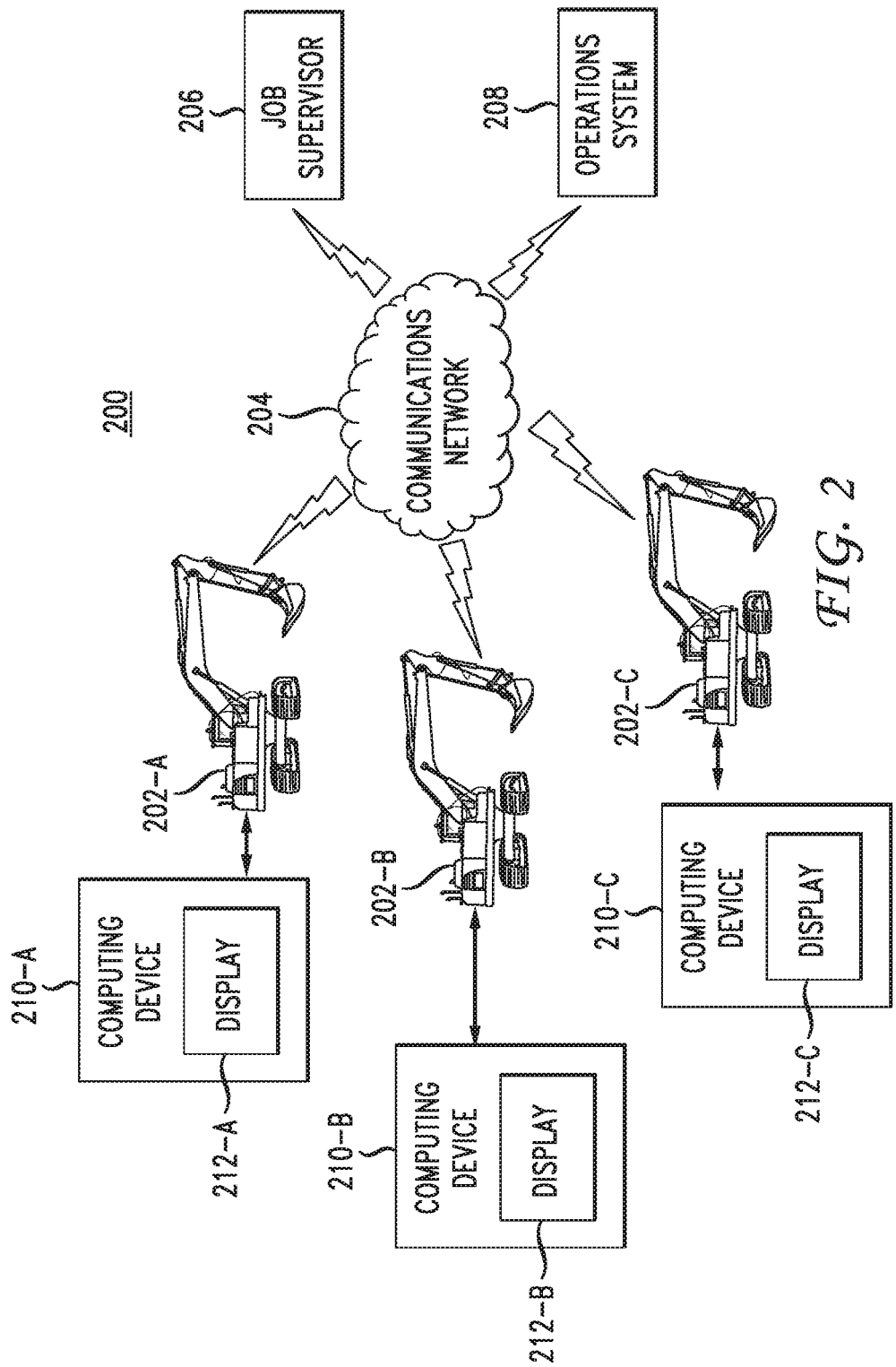
FIG. 2 depicts a high-level overview of a construction site, in accordance with one or more embodiments.

FIG. 2 shows a high-level overview of a construction site 200 in accordance with one or more embodiments. Construction site 200 includes machines or devices 202-A, 202-B, and 202-C, collectively referred to as machines 202. Machines 202 may include any machine or device for construction, such as, e.g., excavator 100 in FIG. 1. It should be understood that while machines 202 are shown in FIG. 2 as machines 202-A, 202-B, and 202-C, machines 202 may include any number of machines of a same or different type.

Communications network 204 facilitates communication between two or more machines 202 (or operators of machines 202), job supervisor 206, and operations system 208. Machines 202 (or operators of machines 202) communicate via computing devices 210-A, 210-B, and 210-C, respectively, collectively referred to a computing devices 210. Communications network 204 may include any suitable network, such as, e.g., a wired or wireless computer network, the Internet, a telephone network, a cellular network, a satellite network, etc. In one embodiment, communications network 204 is a mesh network where each machine 202, operator, and/or job supervisor 206 acts as a node to cooperate in the distribution of data. In this embodiment, each node is communicatively coupled with all other nodes (that are within communication range).

Operators may communicate over communications network 204 using one or more computing devices 210. Computing devices 210 may include any device capable of communicating over communications network 204, such as, e.g., a mobile phone, a tablet, a computer, smart glasses, etc. Computing devices 210 may include displays 212-A, 212-B, and 212-C, respectively, collectively referred to as displays 212. Displays 212 may display the tasks of a construction project and other pertinent information. In one embodiment, computing devices 210 are external systems independent of their associated machines 202. For example, computing devices 210 may be mobile computing devices of operators of machines 202, such as, e.g., a phone or tablet. This embodiment may be particularly useful where job supervisor 206 dispatches a simple task to the operator. In another embodiment, computing devices 210 are internal modules of their associated machines 202, which may be advantageous for complex sets of tasks.

Job supervisor 206 oversees the planning and operations of the entire construction project of construction site 200, e.g., from a site office. Operators and/or job supervisor 206 interact with operations system 208 to receive feedback on the performance of the operators (e.g., using displays 212). Operations system 208 may be accessed over communications network 204 or may be accessed directly. For example, operations system 208 may be located at the site office, where job supervisor 206 accesses operations system 208 directly. Operations system 208 is described in further detail as follows.

Figure 3:
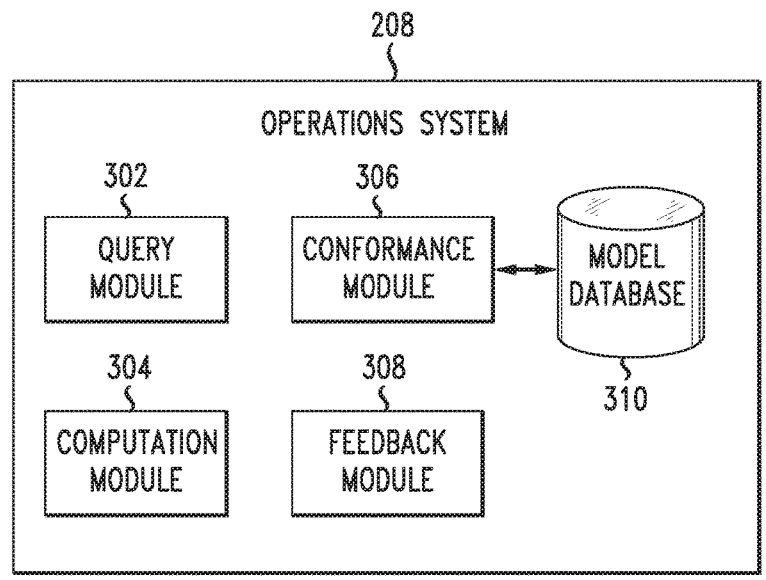
FIG. 3 depicts an operations system for providing guidance to an operator of a construction machine for performing a task, in accordance with one or more embodiments.

FIG. 3 shows operations system 208 in accordance with one or more embodiments. Operations system 208 provides guidance and feedback to the operator of a machine for performing a task according to operating procedures.

Query module 302 polls machines (e.g., machines 202) for machine data, e.g., over communications network 204. Machine data may include on-board measurements provided directly by the machine, such as, e.g., engine load data, cylinder pressure, speed, etc. In some embodiments, the machines may include sensors to provide, e.g., swing data, tilt, positioning, etc. The sensors may include, e.g., motion sensors, tilt sensors, load sensors, proximity sensors, rotary encoders, positioning systems (e.g., global navigation satellite system), imaging systems (e.g., cameras, radars, scanners), etc.

In one example, query module 302 polls sensors (not shown) on excavator 100 of FIG. 1 to provide machine data regarding the location of undercarriage 110, the speed or acceleration of the tracks or wheels of undercarriage 110, the swing of stick 106, the load on bucket 108, etc. Query module 302 may also poll excavator 100 directly to determine engine load data and other data of the machine. Other types of data may also be polled from excavator 100.

Computation module 304 computes kinematics behavior or data of the machine from the machine data polled by query module 302. The kinematics behavior may include various machine loads and other information of the machine, such as, e.g., dimensional data, capacity data, consumption data, constraints data, maximum velocities and accelerations of each machine component (with and without loads), center of mass calculations, maximum pitch/roll (lean) of the machine (on various types of terrain), etc.

Conformance module 306 compares the kinematics behavior of the machine determined by computation module 304 with models stored in model database 310. The models in model database 310 define operational practices for operating the machine in performing different tasks based on the task being performed and the type and/or model of the machine. The models define parameters of a task, such as, e.g., static and dynamic geometrical constraints, hydraulic pressure targets for optimal usage, engine load targets for optimal usage, speed and acceleration limits, etc. The models may also include, e.g., suggestions for equipment size and type based on the task and environment, optimum relative location for each machine, etc.

The models of operational practices may be defined in accordance with one or more objectives. The objective may be, e.g., efficiency, safety, reduced wear and tear of machines, etc. For example, the models may define operational practices that reflect how a best operator would perform. Model database 310 may include a plurality of models for a specific task and/or for a type or model of the machine corresponding to different objectives. In one embodiment, the parameters of a model are defined according to specifications from the manufacturer of the machine. In another embodiment, the parameters of a model are defined by a user (e.g., job supervisor 206 or machine operator) to customize the model for a particular task or construction project.

Model database 310 may include general models and specific models. The general models may be generally applied to machines by type. For example, model database 310 may include general models for an excavator, bulldozer, dump truck, etc. The specific models may be applied to a particular model of a machine. In this manner, conformance module 306 may compare the kinematics behavior of a machine with a general model where a specific model for that particular machine is not included in model database 310.

Figure 4:
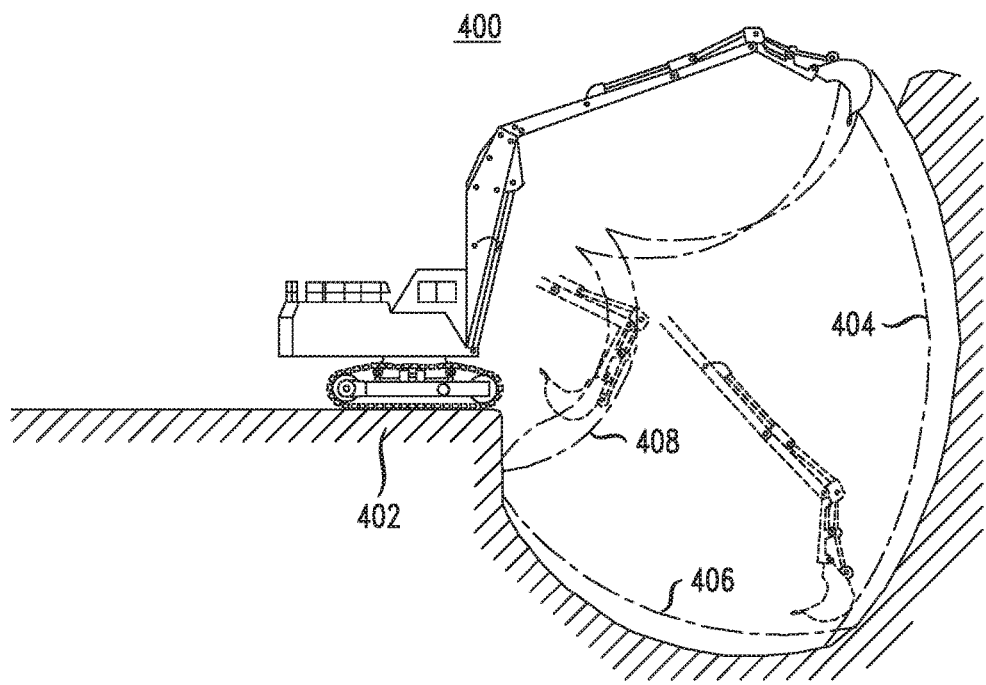
FIG. 4 depicts an excavator having actions represented in a model of the best operational practices, in accordance with one or more embodiments.

FIG. 4 shows an excavator 400 performing the task of digging a trench in accordance with one or more embodiments. A model (general or specific) for excavator 400 defines various parameters for performing this task. For example, the model may define a particular location 402 of the undercarriage of excavator 400, a target hydraulic pressure for movements 404 and 406 of the initial dig, a maximum capacity load for the bucket of excavator 400 during the excavation movement 408, a suggestion for bucket size and type based on width of the trench and material to be excavated, optimum relative location for a dump truck being loaded based on swing radius and loading, etc.

Returning to FIG. 3, feedback module 308 provides feedback to the operator of machine 202, job supervisor 206, and/or others based on the comparison performed by conformance module 306. Feedback module 308 converts comparison data into easy-to-interpret suggestions for improvement in operations or performance review. Feedback module may also provide additional information to the operator relating to the construction project, such as, e.g., completion percentage, estimated time to completion, etc. Feedback can be provided directly to a machine, to an operator or job supervisor, at a site office, or any other location over communications network 204. This may involve one or more display elements, sound actuators, or any other types of notification devices to provide feedback in real-time or near real-time. For example, feedback module 308 may provide feedback to operator of machine 202 using display 212. In an illustrative embodiment, feedback is provided visually to provide a rendering of the optimal combination of machine components (e.g., body, boom, stick, etc.) as an overlay or secondary image to the actual current machine and component positions. In one embodiment, feedback is directly sent to computing device 210 of machine 202 to allow the machine to autonomously complete the task with little or no operator involvement.

In one embodiment, the display elements (e.g., displays 212) include augmented reality display devices for augmenting a live direct view of the physical world with information relating to the task, the construction project, and/or other information. For example, windows of cab 102 of excavator 100 of FIG. 1 can be configured as the augmented reality display to provide an augmented reality view to the operator. Other examples of augmented reality display devices include a head-mounted display such as a visor of a protective helmet, smart glasses, contact lenses, etc.

Figure 5:
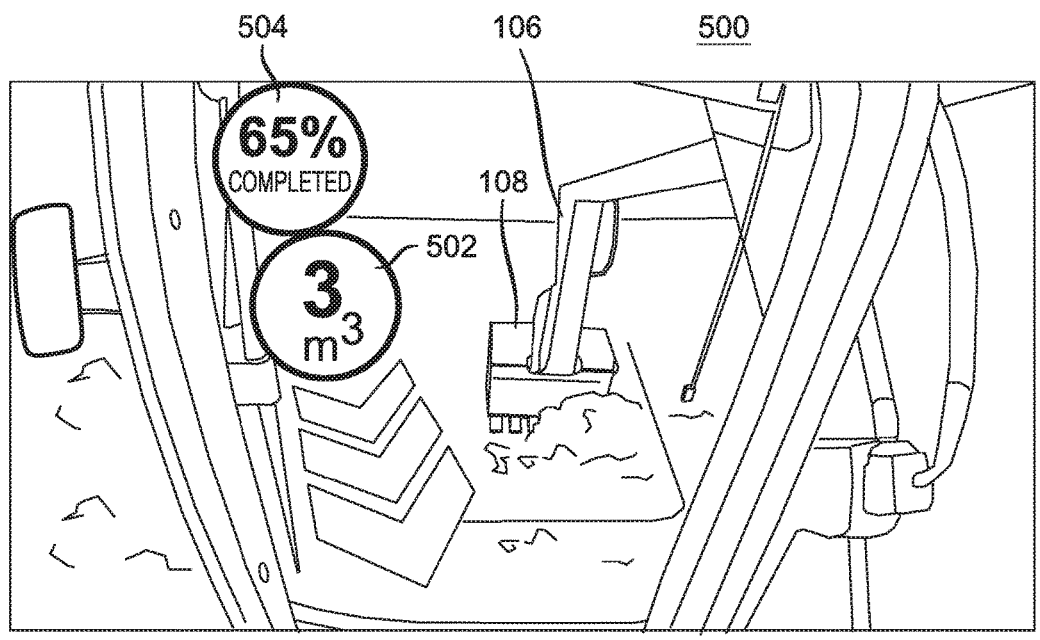
FIG. 5 depicts an operator's view from a cab of an excavator having indicators shown on an augmented reality display device, in accordance with one or more embodiments.

FIG. 5 shows an operator's view 500 from inside cab 102 of excavator 100 of FIG. 1 in accordance with one or more embodiments. From inside cab 102, operator can see stick 106 and bucket 108. The windows of cab 102 are configured as augmented reality display devices to overlay feedback, guidance and other relevant information over a live direct view for presentation to the operator. The feedback includes movement indicator 502, which indicates to the operator to excavate three cubic meters of dirt towards excavator 100. The feedback also includes completion indicator 504, which indicates a completion percentage of the task. Other forms of feedback and indicators may also be employed.

Figure 6:
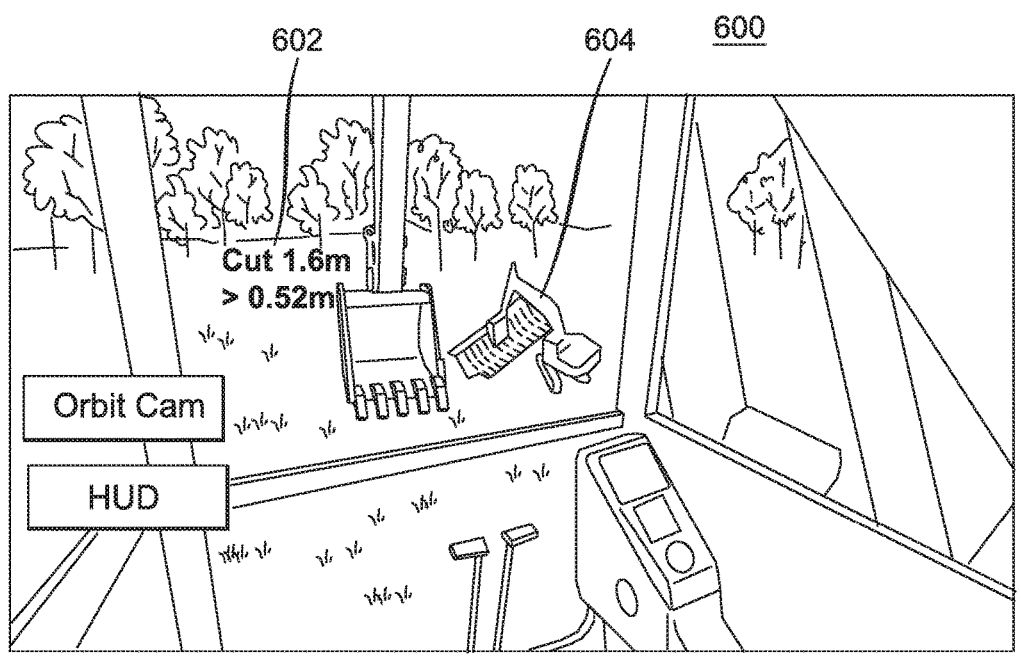
FIG. 6 depicts an operator's view from a cab of an excavator having indicators shown on an augmented reality display device, in accordance with one or more embodiments.

FIG. 6 shows an operators view 600 from inside cab 102 of excavator 100 of FIG. 1 according to one or more embodiments. The windows of cab 102 are configured as augmented reality display devices. A guidance indicator 602 is shown, which indicates to the operator to cut 0.52 meters to the right for a total cut of 1.6 meters. A simulation indicator 604 is also displayed, which shows a simulated performance of the task. Other forms of feedback and indicators may also be employed.

Figure 7:
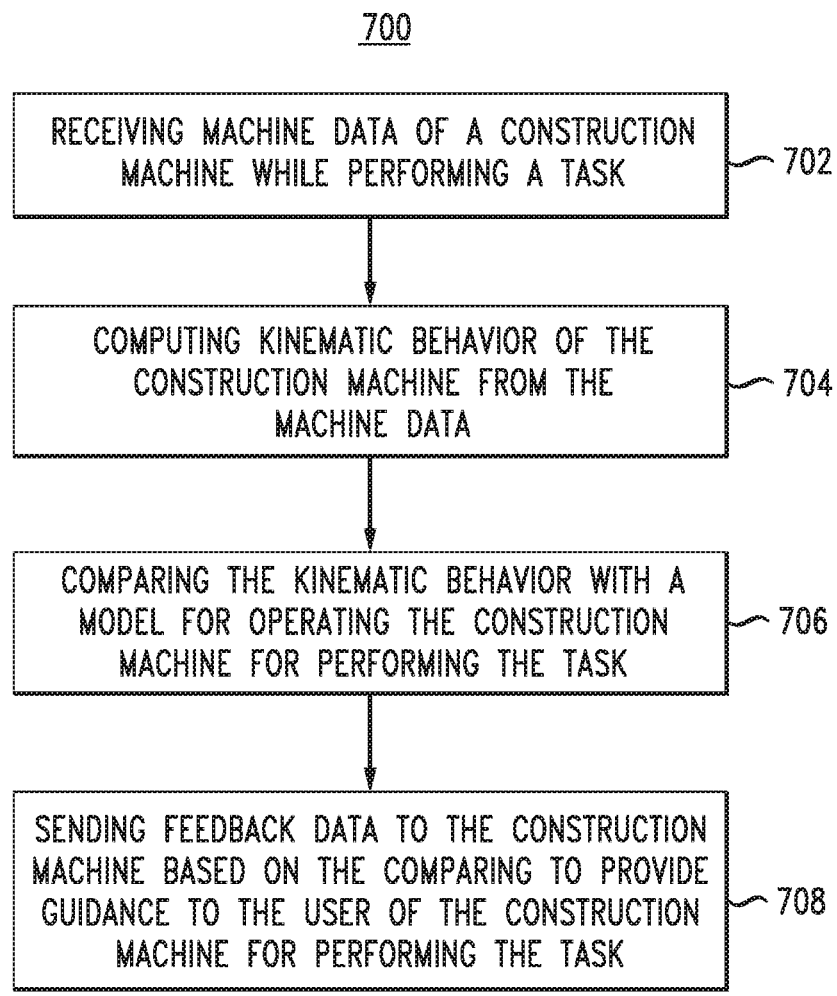
FIG. 7 depicts a flow diagram of a method for providing guidance to an operator of a construction machine for performing a task, in accordance with one or more embodiments.

FIG. 7 shows a flow diagram of a method 700 for providing guidance to an operator of a construction machine for performing a task according to operating procedures, in accordance with one or more embodiments. Method 700 may be performed by, e.g., operations system 208.

At step 702, machine data of a construction machine performing a task is received. The machine data may include raw on-board measurements provided directly by the construction machine, such as, e.g., engine load data, cylinder pressure, speed, etc. The machine data may also include data from sensors equipped on the construction machine, such as, e.g., load sensors, accelerometers, tilt sensors, imaging sensors, location sensors, etc.

At step 704, kinematic behavior of the construction machine is computed from the raw machine data. Additional meta-data may be induced based on this behavior, such as, e.g., load mass and volume, center of mass estimation, component strain, proximity to safety limits etc. If movement and acceleration of every component of the machine is monitored in real-time (and/or recorded for post-processing) and if relevant hydraulic pressures are monitored and recorded, such physical meta-data for the construction machine may be computed for subsequent evaluation.

At step 706, the kinematic behavior is compared with the model for operating the construction machine for performing the task. The model includes parameters defining operational practices for operating the construction machine to perform the task. For example, the parameters may include static and dynamic geometrical constraints, hydraulic pressure targets for optimal usage, engine load targets for optimal usage, speed and acceleration limits, etc. Such constraints may be known from the original equipment manufacturer. The models may also include additional parameters, such as, e.g., suggestions for equipment size and type based on the task and environment, optimum relative location for each machine, etc.

The model for operating the construction machine may be a specific model for a particular model of the construction machine or a general model for a type (e.g., excavator, bulldozer, dump truck, etc.) of the construction machine. For example, where a specific model of the construction machine is unavailable, a general model for a type of the construction machine may be selected. The model for operating the construction machine may be defined according to specification from the manufacturer of the construction machine or may be defined by a user (e.g., job supervisor, operator, etc.) to customize the model for the particular task.

At step 708, feedback data is sent to the construction machine (e.g., operator) based on the comparing to provide guidance to the user of the construction machine for performing the task. For example, the feedback data may be sent to the construction machine for presentation to a user of the construction machine. The presentation may involve a display device, a sound actuator, or any other type of notification device. In one embodiment, the feedback data may be displayed using an augmented reality display device to overlay the feedback data on a window of the construction machine. For example, the feedback data may include a guidance indicator overlaid on the window on the construction machine indicating a quantity and direction to excavate dirt.

In one embodiment, the feedback data includes instructions for guiding an operator in operating the construction machine to perform the task. In this embodiment, results of the comparing (in step 706) are converted to instructions for guiding the operator. This operator feedback may be in the form of graphical and/or audible warnings via an on-board computer display console. Warnings related to safety (e.g., dangerous imbalance scenarios determined from center of mass calculations) may be prioritized and presented more obtrusive. Warnings related to recommended machine limits being reached (e.g., hydraulic pressures or component strain) may have a lower priority and may be less obtrusive. The feedback data may also be combined with task-related information (e.g., current volume of excavated materials, estimated time to completion, current production rate, etc.) and may suggest actions based on operational models (e.g., alternative machine placement). In some embodiment, the feedback data may also be provided to other users, such as, e.g., a job supervisor, to monitor performance of the operator.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 7. Certain steps of the methods described herein, including one or more of the steps of FIG. 7, may be performed by a server or by another processor in a network-based cloud-computing system. Certain steps of the methods described herein, including one or more of the steps of FIG. 7, may be performed by a client computer in a network-based cloud computing system. The steps of the methods described herein, including one or more of the steps of FIG. 7, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 7, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
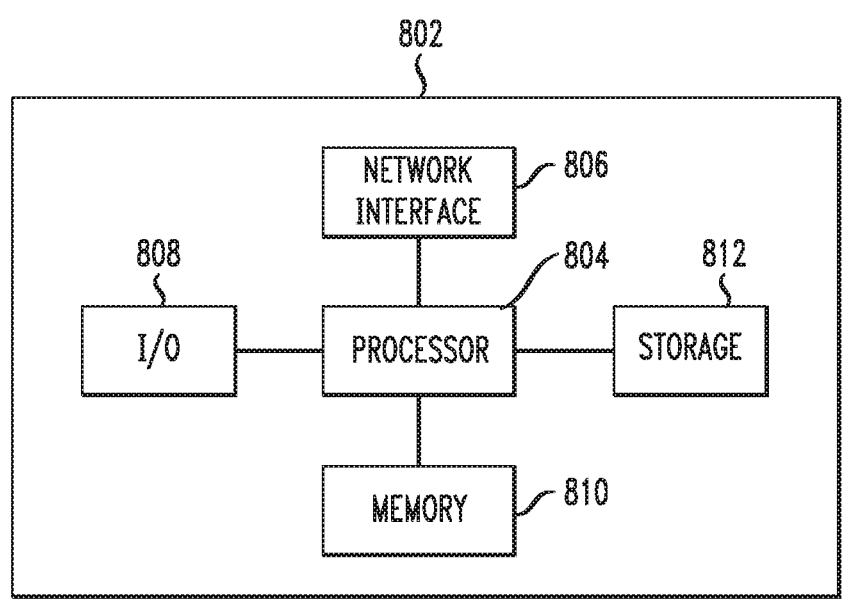
FIG. 8 depicts a high-level schematic of a computer system, in accordance with one or more embodiments.

A high-level block diagram 800 of an example computer that may be used to implement systems, apparatus, and methods described herein is depicted in FIG. 8. Computer 802 includes a processor 804 operatively coupled to a data storage device 812 and a memory 810. Processor 804 controls the overall operation of computer 802 by executing computer program instructions that define such operations. The computer program instructions may be stored in data storage device 812, or other computer readable medium, and loaded into memory 810 when execution of the computer program instructions is desired. Thus, the method steps of FIG. 7 can be defined by the computer program instructions stored in memory 810 and/or data storage device 812 and controlled by processor 804 executing the computer program instructions. For example, the computer program instructions can be implemented as computer executable code programmed by one skilled in the art to perform the method steps of FIG. 7. Accordingly, by executing the computer program instructions, the processor 804 executes the method steps of FIG. 7. Computer 802 may also include one or more network interfaces 806 for communicating with other devices via a network. Computer 802 may also include one or more input/output devices 808 that enable user interaction with computer 802 (e.g., display, keyboard, mouse, speakers, buttons, etc.).

Processor 804 may include both general and special purpose microprocessors, and may be the sole processor or one of multiple processors of computer 802. Processor 804 may include one or more central processing units (CPUs), for example. Processor 804, data storage device 812, and/or memory 810 may include, be supplemented by, or incorporated in, one or more application-specific integrated circuits (ASICs) and/or one or more field programmable gate arrays (FPGAs).

Data storage device 812 and memory 810 each include a tangible non-transitory computer readable storage medium. Data storage device 812, and memory 810, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 808 may include peripherals, such as a printer, scanner, display screen, etc. For example, input/output devices 808 may include a display device such as a cathode ray tube (CRT) or liquid crystal display (LCD) monitor for displaying information to the user, a keyboard, and a pointing device such as a mouse or a trackball by which the user can provide input to computer 802.

Any or all of the systems and apparatus discussed herein, including operations system 208 of FIG. 3, may be implemented using one or more computers such as computer 802.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer processor implemented method for providing guidance to a user of a construction machine, comprising:
   computing kinematic behavior of a construction machine based on data received from the construction machine while performing a construction task;
   selecting one of a plurality of models for operating the construction machine based on an objective for performing the construction task, each of the plurality of models associated with a respective one of a plurality of objectives and defining parameters of the construction machine for performing the construction task in accordance with the respective objective;
   comparing the kinematic behavior with the parameters of the selected model; and
   sending feedback data to the construction machine based on the comparing to provide guidance to the user of the construction machine for performing the construction task.

2. The computer processor implemented method as recited in claim 1, wherein selecting one of a plurality of models for operating the construction machine comprises:
selecting the model for operating the construction machine as a specific model for a particular model of the construction machine.

3. The computer processor implemented method as recited in claim 1, wherein selecting one of a plurality of models for operating the construction machine comprises:
selecting the model for operating the construction machine as a general model for a type of the construction machine.

4. The computer processor implemented method as recited in claim 3, wherein selecting the model for operating the construction machine as a general model for a type of the construction machine comprises:
selecting the model for operating the construction machine as the general model for the type of the construction machine when a specific model specific to the construction machine is unavailable in the model database.

5. The computer processor implemented method as recited in claim 1, wherein sending feedback data to the construction machine based on the comparing to provide guidance to the user of the construction machine for performing the construction task comprises:
converting results of the comparing into instructions for providing guidance to the user of the construction machine for performing the construction task.

6. The computer processor implemented method as recited in claim 1, wherein sending feedback data to the construction machine based on the comparing to provide guidance to the user of the construction machine for performing the construction task comprises:
sending display data for displaying the feedback data to the construction machine.

7. The computer processor implemented method as recited in claim 1, wherein the parameters comprise at least one of geometrical constraints, target engine loads, and speed limits.

8. The computer processor implemented method as recited in claim 1, wherein the parameters are defined based on specifications from a manufacturer of the construction machine.

9. An apparatus for providing guidance to a user of a construction machine, comprising:
a processor; and
a memory to store computer program instructions, the computer program instructions when executed on the processor cause the processor to perform operations comprising:
computing kinematic behavior of a construction machine based on data received from the construction machine while performing a construction task;
selecting one of a plurality of models for operating the construction machine based on an objective for performing the construction task, each of the plurality of models associated with a respective one of a plurality of objectives and defining parameters of the construction machine for performing the construction task in accordance with the respective objective;
comparing the kinematic behavior with the parameters of the selected model; and
sending feedback data to the construction machine based on the comparing to provide guidance to the user of the construction machine for performing the construction task.

10. The apparatus as recited in claim 9, wherein selecting one of a plurality of models for operating the construction machine comprises:
selecting the model for operating the construction machine as a specific model for a particular model of the construction machine.

11. The apparatus as recited in claim 9, wherein selecting one of a plurality of models for operating the construction machine comprises:
selecting the model for operating the construction machine as a general model for a type of the construction machine.

12. The apparatus as recited in claim 11, wherein selecting the model for operating the construction machine as a general model for a type of the construction machine comprises:
selecting the model for operating the construction machine as the general model for the type of the construction machine when a specific model specific to the construction machine is unavailable in the model database.

13. The apparatus as recited in claim 9, wherein sending feedback data to the construction machine based on the comparing to provide guidance to the user of the construction machine for performing the construction task comprises:
converting results of the comparing into instructions for providing guidance to the user of the construction machine for performing the construction task.

14. The apparatus as recited in claim 9, wherein sending feedback data to the construction machine based on the comparing to provide guidance to the user of the construction machine for performing the construction task comprises:
sending display data for displaying the feedback data to the construction machine.

15. The apparatus as recited in claim 9, wherein the parameters comprise at least one of geometrical constraints, target engine loads, and speed limits.

16. The apparatus as recited in claim 9, wherein the parameters are defined based on specifications from a manufacturer of the construction machine.

17. A non-transitory computer readable medium storing computer program instructions for providing guidance to a user of a construction machine, which, when executed on a processor, cause the processor to perform operations comprising:
computing kinematic behavior of a construction machine based on data received from the construction machine while performing a construction task;
selecting one of a plurality of models for operating the construction machine based on an objective for performing the construction task, each of the plurality of models associated with a respective one of a plurality of objectives and defining parameters of the construction machine for performing the construction task in accordance with the respective objective;
comparing the kinematic behavior with the parameters of the selected model; and
sending feedback data to the construction machine based on the comparing to provide guidance to the user of the construction machine for performing the construction task.

18. The non-transitory computer readable medium as recited in claim 17, wherein selecting one of a plurality of models for operating the construction machine comprises:

selecting the model for operating the construction machine as a specific model for a particular model of the construction machine.

19. The non-transitory computer readable medium as recited in claim 17, wherein selecting one of a plurality of models for operating the construction machine comprises:
selecting the model for operating the construction machine as a general model for a type of the construction machine.

20. The non-transitory computer readable medium as recited in claim 19, wherein selecting the model for operating the construction machine as a general model for a type of the construction machine comprises:
selecting the model for operating the construction machine as the general model for the type of the construction machine when a specific model specific to the construction machine is unavailable in the model database.

\* \* \* \* \*